(12) United States Patent
Galea et al.

(10) Patent No.: US 12,181,363 B2
(45) Date of Patent: Dec. 31, 2024

(54) FORCE SENSING DEVICE FOR OUTPUTTING A SIGNAL

(71) Applicant: Methode Electronics Malta Ltd., Birkirkara (MT)

(72) Inventors: Alexander Galea, Dingli (MT); Johannes Gießibl, Amerang (DE)

(73) Assignee: Methode Electronics Malta Ltd., Birkirkara (MT)

( * ) Notice: Subject to any disclaimer, the term of this patent is extended or adjusted under 35 U.S.C. 154(b) by 277 days.

(21) Appl. No.: 17/948,351

(22) Filed: Sep. 20, 2022

(65) Prior Publication Data

US 2023/0086820 A1 Mar. 23, 2023

(30) Foreign Application Priority Data

Sep. 23, 2021 (DE) ...................... 10 2021 124 695.4

(51) Int. Cl.
| | | |
|---|---|---|
| *G01L 5/13* | (2006.01) | |
| *B60D 1/04* | (2006.01) | |
| *B60D 1/64* | (2006.01) | |
| *B60D 1/06* | (2006.01) | |

(52) U.S. Cl.
CPC ............... *G01L 5/136* (2013.01); *B60D 1/04* (2013.01); *B60D 1/64* (2013.01); *B60D 1/065* (2013.01)

(58) Field of Classification Search
USPC ...................................................... 73/862.01
See application file for complete search history.

(56) References Cited

U.S. PATENT DOCUMENTS 5,052,232 A * 10/1991 Garshelis ................ G01L 3/105
73/862.336

FOREIGN PATENT DOCUMENTS

| EP | 2650149 A1 * | 10/2013 | ............... B60D 1/06 |
| JP | 3770773 B2 * | 4/2006 | |
| JP | 4779246 B2 * | 9/2011 | ........... G01L 5/1627 |

* cited by examiner

*Primary Examiner* — Clayton E. LaBalle
*Assistant Examiner* — Warren K Fenwick
(74) *Attorney, Agent, or Firm* — Greenberg Traurig, LLP

(57) ABSTRACT

A force sensing device generates an output signal containing information usable for determining a magnitude and a direction of a force acting on a coupling. The coupling has a hook and a linking element linking the hook to a connection flange. The linking element is linked to the hook and the connection flange by at least two pins. Each pin comprises a torque sensor. The linking element is arranged at an angle with respect to the hook such that independent of the angle of the slope between an imaginary horizontal plane and the longitudinal axis of the connection flange, the linking element does not reach a position, in which the two pins are arranged one above the other in a vertical direction relative to a longitudinal axis of the connection flange.

8 Claims, 3 Drawing Sheets

FORCE SENSING DEVICE FOR OUTPUTTING A SIGNAL

RELATED APPLICATION DATA

Figure 1:
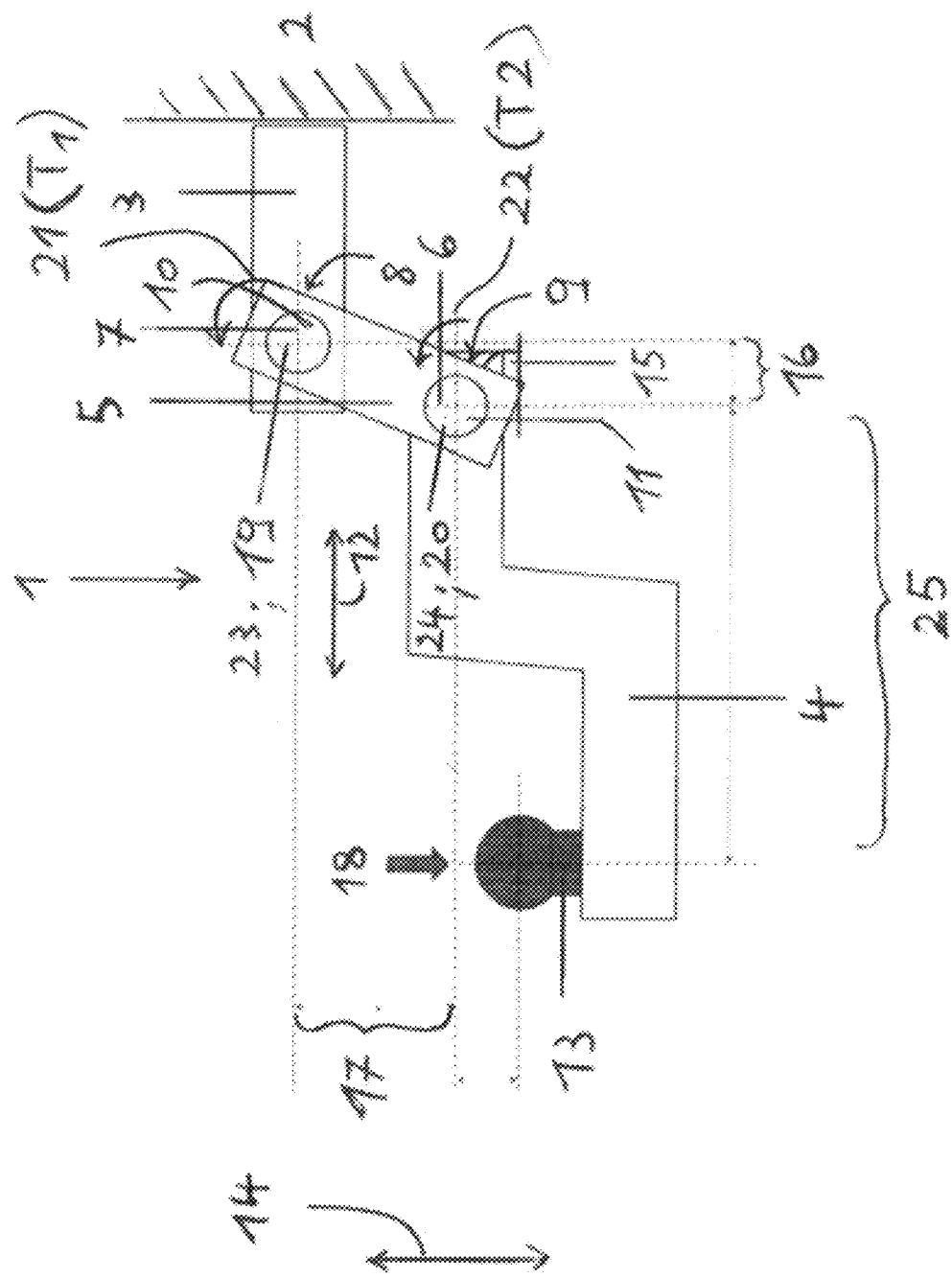

This application claims priority benefit of German patent application ser. no. DE 10 2021 124 695.4, filed Sep. 23, 2021, the disclosure of which is incorporated by reference herein.

SUMMARY

The disclosure relates to a force sensing device for outputting a signal containing information usable for determining a magnitude and a direction of a force acting on a coupling. The force sensing device has a hook and a linking element that links the hook to a connection flange. The linking element is linked to the hook and to the connection flange by at least two pins. Each pin comprises a torque sensor. The linking element is arranged at an angle with respect to the hook, such that independent of the angle of the slope between an imaginary horizontal plane and the longitudinal axis of the connection flange, the linking element does not reach a position, in which the two pins are arranged one above the other in a vertical direction relative to a longitudinal axis of the connection flange.

BACKGROUND

The EP 2 650 149 A1 reveals a ball and socket point for a towing hook for a vehicle. The ball and socket point comprise a ball portion and a socket portion. The towing hook can be displaced between a towing position and a retracted position after assembly with the vehicle. The socket portion of the ball and socket point is configured to enable the ball position to rotate at least 120 degrees about a first access of rotation and at least 80 degrees about a second access of rotation with respect to the towing position.

Problems to be Solved by the Disclosure

Known force sensing devices for outputting a signal are often based on measuring the shear force of a connecting pin or plug. The following description refers to the term pin.

When a force, also referred to as pull force, acts along the direction of pull on the coupling of the vehicle there is a risk that the pin housing the sensor deforms and/or bends.

The signal value obtained by the sensor may also be distorted by a friction occurring between the pin and bearing bushes housing the pin.

In known sensing devices the pull force acting on the coupling may change into a force acting axially on the pin instead of acting on the pin as a shear force.

Solution of the Problems

A horizontal force acts on the hook, preferably on a tow ball of the hook. The horizontal force may also be called F-tow.

Alternatively, the horizontal force acts on the hook together with a vertical force. The vertical force may also be called F-tongue.

Both the vertical force as such and the combination of the vertical force and the horizontal force are transmitted from the hook to a connection flange via a linking element.

The linking element is connected to the hook and to the connection flange by means of at least one pin, respectively.

Each pin comprises a torque sensor. The torque sensor of the respective pin determines the force that acts on the corresponding pin due to the horizontal force (F-tow).

Alternatively, the torque sensor of the respective pin determines the force that acts on the associated pin due to the interaction of the vertical force with the horizontal force both acting on the hook, respectively.

To determine the force acting on the hook, the force is determined serially by one torque sensor after another.

To determine the force acting on the hook, the difference between the measured values of the respective torque sensors is determined.

To determine the force acting on the hook, the acting force is determined serially from one torque sensor after the other.

The force acting on the hook is then determined from the difference of the sensor signal values serially determined by the individual torque sensors.

If the towing vehicle with the hook attached to it is positioned on a surface that has an angle of slope relative to the horizontal, the signal value which is determined by the respective torque sensor can be adjusted by the value of the angle of slope.

Alternatively, the difference between the signal values determined serially by the torque sensors can be adjusted by the angle of slope value.

According to the disclosure, the linking element is arranged at an angle with respect to the hook. With this angle being present, it is irrelevant whether the towing vehicle is on a road that is horizontal, or whether the towing vehicle is positioned on an inclined road relative to the horizontal.

Regardless of the angle of the slope between an imaginary horizontal plane and the longitudinal axis of the connection flange the linking element does not reach a position, in which the two pins are arranged one above the other in the vertical, relative to a longitudinal axis of the connection flange.

Thus, the problems are solved by a force sensing device for outputting a signal containing information usable for determining a magnitude and a direction of a force acting on a coupling.

The force sensing device provides a connection flange mounted to a section of a towing vehicle.

The disclosure provides a linking element linking the connection flange with the hook.

At least one pin, also referred to as first pin, connects the linking element to the connection flange. At least one pin, also referred to as second pin, connects the linking element to the hook.

The respective pins each comprise a torque measuring sensor, respectively for outputting a signal containing information usable for determining the magnitude and the direction of the force acting on a coupling.

The hook may be any kind of a tow coupling apparatus. Thus, the hook can be technically constructed in different ways.

By way of example, in the following it is assumed that the hook carries a tow ball. The coupling part of the trailer corresponding to the tow ball of the hook of the towing vehicle. It is assumed that the coupling part of the trailer rests on the tow ball of the towing vehicle.

Connection Flange

The term coupling used by the disclosure comprises the connection flange and the linking element. Additionally, the term coupling also comprises the hook.

It is also assumed that the coupling is mounted to the towing vehicle. The coupling part of the trailer corresponding to the tow ball of the towing vehicle. It goes without saying that both the towing vehicle or the trailer may carry the tow ball.

The connection flange linked to the vehicle is connected by the linking element with the hook.

Following the assumption above, the connection flange of the coupling is attached to the axle of the towing vehicle. It goes without saying that the coupling may also be attached to any other component of the towing vehicle.

In a driving condition, the pull force of the vehicle is transmitted to the coupling part of the trailer by the hook of the coupling.

The pull force is further transmitted from the connection flange via the linking element to the hook.

The linking element will be referred to in more detail below.

Preferably, the connection flange is a steel tube. The steel tube can also be a hollow body. It can also be a solid body. The preceding example is only exemplary and does not mean to be comprehensive.

For further reinforcement, the connection flange may have struts linking the connection flange with the axle to which the connection flange is attached.

Linking Element

The linking element is arranged to link the connection flange to the hook of the coupling.

The linking element holds the connection flange and the hook in a predetermined position relative to each other.

The distance of the connection flange relative to the hook can be determined by the length of the linking element.

Relative to the longitudinal axis of the connection flange, the offset of the connection flange relative to the hook can be determined by the angle at which the linking element is arranged relative to a vertical line extending perpendicular to the longitudinal axis of the connection flange.

The predetermined position of the connection flange relative to the hook is maintained both during the braking process and during the acceleration process.

In order to maintain the mutual position of the linking element relative to the connection flange and to maintain the mutual position of the linking element relative to the hook, the linking element has at least two openings.

To secure the position of the connection flange relative to the linking element a first pin is passed through the aligned openings of the linking element and the connection flange.

To secure the position of the hook relative to the linking element a second pin is passed through the aligned openings of the linking element and the hook.

The first pin and the second pin each comprise a torque sensor. The torque sensor will be referred to in more detail below.

Hook

The hook of the towing vehicle comprises a tow ball.

The hook can also be referred to as tow hitch. In the following however, the term hook will be used.

At its front end, facing away from the linking element, the hook comprises the tow ball.

At its rear end, facing away from the tow ball, the hook is connected to the linking element.

The coupling part of the trailer corresponding to the tow ball of the towing vehicle rests on the tow ball of the hook of the towing vehicle.

The tow ball can have a spherical or a hemispherical form. It goes without saying that the tow ball may also have any other geometric shape.

The tow ball of the hook allows a towed trailer to swivel and to articulate.

When the vehicle is stationary, a vertical force acts on the tow ball of the hook. By way of generalisation, the disclosure assumes that the vertical force acting on the tow ball corresponds to approx. 5%-15% of the trailer weight, but depends, however, to a large extend on the way the trailer is loaded.

In a forward move, the tow ball of the hook is additionally subjected to a pull force. According to the disclosure, the pull force is used to generate a motion between the towing vehicle (car) and a tangential surface (street), when pulling a trailer.

The tow ball of the hook may come in a variety of different sizes.

The size of the tow ball depends on the load the hook of the coupling is supposed to carry.

The hook of the vehicle's coupling can be used for pulling a vehicle on ground, a boat and/or an aircraft.

For simplification, in the following the term hook is used in connection with a coupling of a vehicle on land.

Pin

A first pin connects the linking element to the connection flange.

The second pin connects the linking element to the hook.

Both the first pin and/or the second pin comprises a torque measuring sensor, respectively.

To secure the position of the connection flange relative to the linking element the first pin is passed through the aligned openings of the linking element and the connection flange.

To secure the position of the hook relative to the linking element the second pin is passed through the aligned openings of the linking element and the hook.

For outputting a signal representing the magnitude and the direction of at least one force acting on the coupling of the vehicle, both the first pin and the second pin each comprise a torque sensor, respectively.

The torque is applied to the respective pin when the force acts on the hook of the coupling. Thus, the torque acting on the pin reflects the force acting on the hook.

The force, reflected by the first pin and/or on the second pin may be a force acting horizontally on the hook.

The force acting vertically on the hook (F-tongue) is based on the fact that the communicating portion of the trailer's coupling rests on the hook of the towing vehicle.

The force (F tow), reflected by the first pin and/or by the second pin, may also be a pull force acting on the hook along the longitudinal axis of the connection flange.

Thus, the force acting on the first pin and/or on the second pin also reflects the pull force acting on the hook when the trailer is towed on a road.

The force acting on the first pin and/or on the second pin may also reflect a force acting at an angle on the hook.

Thus, the force acting on the first pin and/or on the second pin at an angle, reflects the pull force acting on the hook when the trailer is pulled along a slope of a road.

In the direction of the longitudinal axis of the connection flange the distance between the first pin and the second pin has a pre-set value.

The distance between the first pin and the second pin extending in a radial direction, relative to the longitudinal axis of the connection flange, has a pre-set value.

Torque Sensor

The torque sensor measures the reaction force generated by an object that is creating the torque.

In the case of the disclosure the respective torque sensor measures the torque applied to the pin.

The torque is applied to the pin when a vertical force (F-tongue) acts on the hook of the coupling.

The torque acting on the pin thus reflects the force acting on the hook.

To put it in another way, the force acting on the first pin and/or on the second pin reflects the force acting vertically on the hook when the communicating portion of the trailer's coupling rests on the hook of the towing vehicle.

Torque is further applied to the pin when a pull force (F-tow) acts on the hook of the coupling, acting along the longitudinal axis of the connection flange.

Thus, the force acting on the first pin and/or on the second pin also reflects the tow force acting on the hook when the trailer is pulled.

The force acting on the first pin and/or on the second pin also reflects the force acting at an angle on the hook relative to the longitudinal axis of the connection flange, when the communicating portion of the trailer's coupling rests on the hook of the towing vehicle. This is the case, when the towing vehicle is positioned on a surface that has an angle of slope relative to the horizontal.

According to the disclosure, the torque sensor is located in the pin.

Gyrometer

The disclosure understands the term gyrometer to mean an instrument used for measuring an angle of the slope of a surface, on which the vehicle is positioned relative to a horizontal line.

The gyrometer provides the value of the angle of the slope of the surface, preferably the road, on which the vehicle is positioned relative to the horizontal line.

Should the vehicle be positioned on uneven terrain, the signal value of the respective torque sensor is adjusted by the value of the angle of slope of the respective surface.

DRAWINGS

Further examples and advantageous embodiments of the disclosure are described in more details with referenced to the following drawings.

Figure 2:
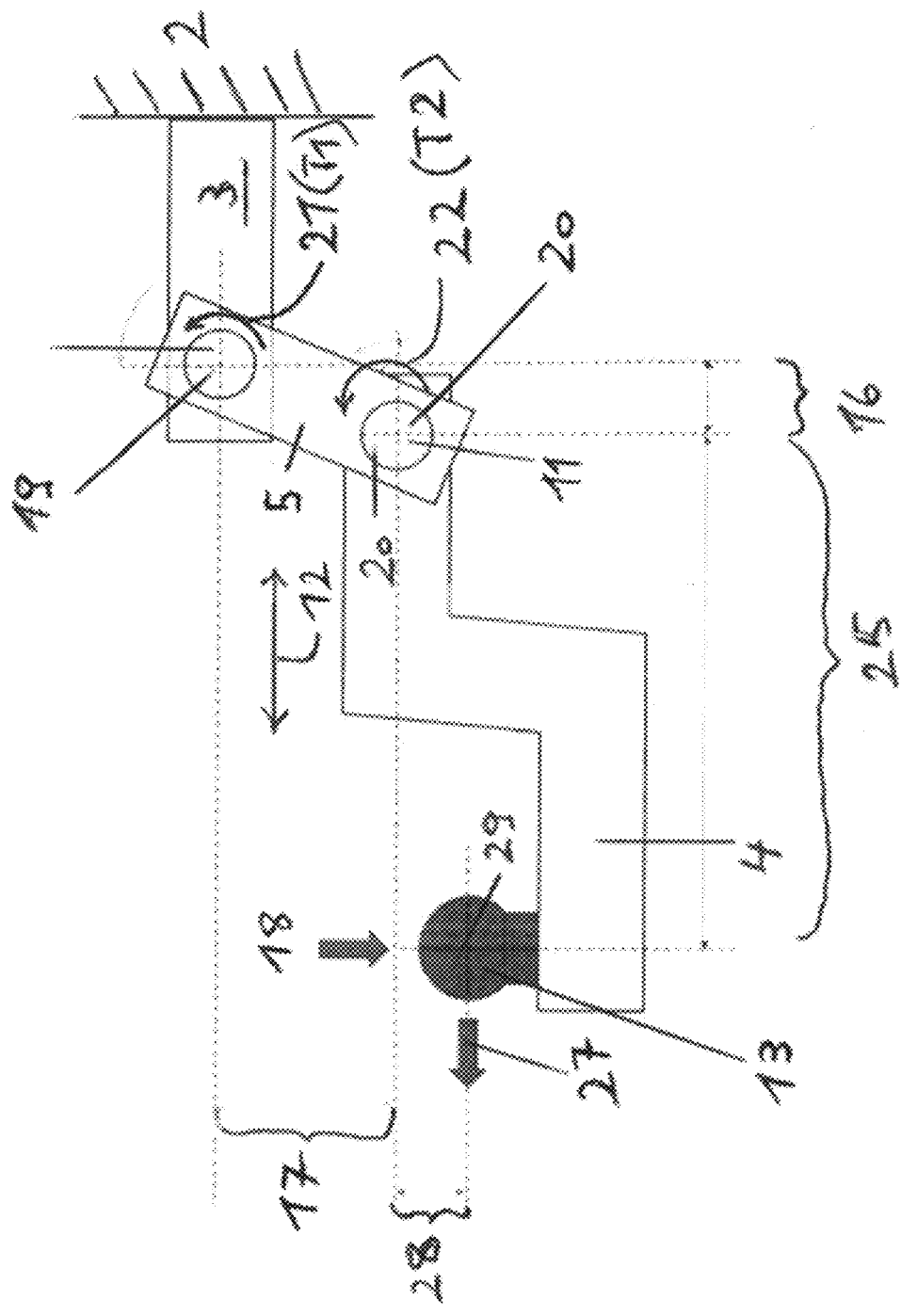
Figure 3:
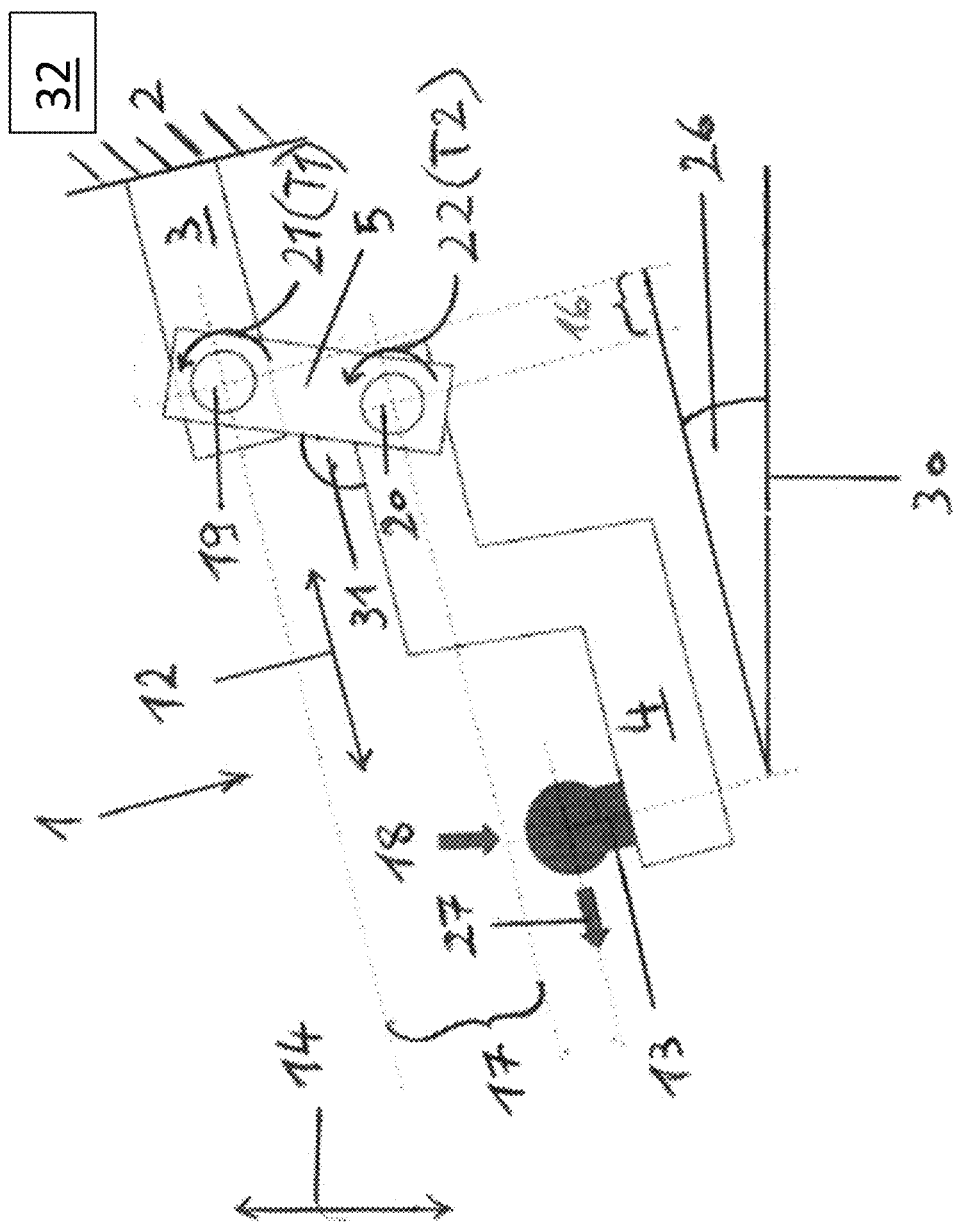

FIG. 1 shows a schematic diagram of a stationary vehicle with a linking element connecting the connection flange to the hook and a load force (F-tongue) being applied on the hook, FIG. 2 shows a schematic diagram, similar to the FIG. 1, with the difference that additionally, a pull force (F-tow) is applied on the hook, and FIG. 3 shows a schematic diagram similar to the FIG. 1, with the difference that both the towing vehicle and the trailer (not shown) are positioned on an uphill road.

DETAILED DESCRIPTION

FIG. 1 shows a vehicle coupling 1 mounted on a towing vehicle 2.

The vehicle coupling 1 comprises a connection flange 3 and a hook 4.

A linking element 5 is provided to link the connection flange 3 of the vehicle coupling 1 to the hook 4.

The linking element 5 provides a first opening 6 and a second opening 7.

In the FIG. 1 the connection flange 3 provides an opening 8.

The hook 4 has an opening carrying the reference 9.

The linking element 5 positions the connection flange 3 in a predetermined position relative to the hook 4.

To do this, the second opening 7 of the linking element 5 is aligned with the opening 8 of the connection flange 3.

At the same time the first opening 6 of the linking element 5 is aligned with the opening 9 of the hook 4.

In order to fix the linking element 5 in a stable position relative to the connection flange 3, a first pin 10 passes through the second opening 7 of the linking element 5 and through the opening 8 of the connection flange 3.

In order to fix the linking element 5 in a stable position relative to the hook 4, a second pin 11 passes through the first opening 6 of the linking element 5 and through the opening 9 of the hook 4.

In the FIG. 1, the connection flange 3 extends a proximately parallel relative to the hook 4 along a longitudinal axis 12 of the connection flange 3.

A tow ball 13 sits on the end of the hook 4, facing away from the linking element 5.

Relative to the longitudinal axis 12 of the connection flange 3, the linking element 5 extends at an acute angle 15 relative to a vertical direction 14.

A distance extending between the first pin 10 and the second pin 11 in the direction of the longitudinal axis 12 of the connection flange 3 carries the reference 16.

A distance extending between the first pin 10 and the second pin 11 in a radial direction relative to the longitudinal access 12 of the connection flange 3 is referred to by reference 17.

When a force 18 (F-tongue) is applied to the tow ball 13, a torque 21 (T1) is performed on the first pin 10.

The torque 21 (T1) performed on the first pin 10 is perceived by a torque sensor 19. The torque 21 (T1) is then emitted as a signal 23 by the torque sensor 19.

When the force 18 (F-tongue) is applied to the tow ball 13, torque 22 (T2) is performed on the second pin 11.

The torque 22 (T2) performed on the second pin 11 is perceived by the torque sensor 20.

The torque 22 (T2) is then emitted as a signal 24 by the torque sensor 20.

Example: Calculation of the Torque 21 (T1) and of the Torque 22 (T2) at a Speed of 0 km/h With a horizontal speed of 0 km/h applies:

$T2 = F_{tongue} * (\text{distance } 25)$ $T1 = F_{tongue} * (\text{distance } 25 + \text{distance } 16)$ $F_{tongue} = (T1 - T2)/x2$ Distance $25 = T27((T1-T2)/\text{distance } 16)$ As the distance 16 is known, the distance 25 and the torque (F-tongue) can be determined.

Wherein in FIG. 1:

T2 represents the torque 22 (T2), sensed by the torque sensor 20. The force 18 representing a F-tongue is applied vertically to the tow ball 13 at a horizontal speed of the towing vehicle 2 of 0 km/h.

T1 represents the torque 21 (T1) sensed by the torque sensor 19, when the force 18 (F-tongue) is applied vertically to the tow ball 13 at a horizontal speed of vehicle of 0 km/h. With the force 18 (F-tongue) representing a force load $F_{tongue}$.

The distance 25 represents the distance between the tow ball 13 of the hook 4 and the second pin 11 along the longitudinal axis 12 of the connection flange 3.

The sum is formed of the distance 25 and the distance 16. The distance 25 represents the distance between the tow ball 13 and the second pin 11 along the longitudinal axis 12 of the connection flange 3. The distance 16 represents the distance between the second pin 11 and the first pin 10 along the longitudinal axis 12 of the connection flange 3.

The FIG. 2 shows a schematic diagram, similar to the FIG. 1 with the difference that additionally a pull force 27 (F-pull) is applied on the hook 4.

In the FIG. 2 the force 18 (F-tongue) representing a force load ($F_{tongue}$) acts vertically on the tow ball 13.

A pull force 27 ($F_{-tow}$) acts on the tow ball 13 along the longitudinal axis 12 of the connection flange 3, as the towing vehicle 2 pulls the trailer (not shown) horizontally at a speed greater than 0 km/h.

Example: Calculation of the Torque 21 (T1) and of the Torque 22 (T2) at a Speed Greater than 0 km/h With a horizontal speed of greater than 0 km/h applies:

$$T2 = F_{tongue}(\text{distance } 25) - F_{tow}(\text{distance } 28)$$

$$T1 = F_{tongue}(\text{distance } 25 + \text{distance } 16) - F_{tow}(\text{distance } 17 + \text{distance } 28)$$

As the distance 17 is known, the product of the tow force 27 ($F_{-tow}$) and the distance 28 can be determined by the formula T2.

The pull force 27 ($F_{-tow}$) can be determined by the formula T1.

$$T1 = F_{tongue}(\text{distance } 25 + \text{distance } 16) - F_{tow}(\text{distance } 17 + \text{distance } 28)$$

$$T2 = F_{tongue}(\text{distance } 25) - F_{tow}(\text{distance } 28)$$

Wherein in FIG. 2:

T2 represents the torque 22 (T2) sensed by the torque sensor 20. The force 18 (F-tongue) representing a F-tongue is applied vertically to the tow ball 13 at a horizontal speed of the towing vehicle 2 of greater than 0 km/h.

The torque 22 (T2) of the FIG. 2 also represents the force 27 (F-tow) which is a tow force ($F_{tow}$) acting along the longitudinal axis 12 of the connection flange 3 and in the direction of pull on the coupling of the towing vehicle 2.

In the FIG. 2 the torque 21 (T1) is sensed by the torque sensor 19, when the force 18 (F-tongue) is applied vertically to the tow ball 13 at a horizontal speed of vehicle of greater than 0 km/h.

The T1 of the FIG. 2 also represents the force 27 (F-tow) which is a pull force ($F_{tow}$) acting along the longitudinal axis 12 of the connection flange 3 and in the direction of pull on the coupling 1 of the vehicle wherein the distance 25 represents the distance between the center of the tow ball 13 of the hook 4 and the center of the second pin 11, along the longitudinal axis 12 of the connection flange 3.

The distance 28 represents a distance, which extends radially to the longitudinal axis 12 between a center 29 of the tow ball 13 and the center of the second pin 11; wherein the sum is formed of the distance 25 and the distance 16, the distance 25 represents the distance between the tow ball 13 and the second pin 11 along the longitudinal axis 12 of the connection flange 3. The distance 16 represents the distance between the second pin 11 and the first pin 10, along the longitudinal axis 12 of the connection flange 3.

Also, the sum is formed of the distance 17 and the distance 28. The distance 17 represents the distance extending between the first pin 10 and the second pin 11 in a radial direction relative to the longitudinal axis 12 of the connection flange 3. The distance 28 represents the distance which extends radially to the longitudinal axis 12 between the centre 29 of the tow ball 13 and the second pin 11.

The schematic diagram of FIG. 3 is basically the same as the diagram of FIG. 2. In contrast to FIG. 2, the schematic diagram of FIG. 3 shows the towing vehicle 2 positioned along a slope of the road.

In the FIG. 3, the slope of the road is shown by the angle of slope 26 arranged between an imaginary horizontal plane 30 and the longitudinal axis 12 of the connection flange 3.

In the FIG. 3, the torque 22 (T2) sensed by the torque sensor 20 represents both the force 18 (F-tongue) applied vertically to the tow ball 13 and the force 27 which is the pull force 27 ($F_{tow}$) acting along the longitudinal axis 12 of the connection flange 3.

Also, in the FIG. 3, the torque 21 (T1) sensed by the torque sensor 19 represents both the force 18 (F-tongue) applied vertically to the tow ball 13 and the force 27 (F-tow), which is the tow force ($F_{tow}$) acting along the longitudinal axis 12 of the connection flange 3.

In the FIG. 3 both the torque 21 (T1) and the torque 22 (T2) are known from the static position of the towing vehicle 2 at a speed of 0 km/h.

The angle of the slope 26 of the road may be determined by using a gyrometer associated with the vehicle.

In the FIG. 3, both the distance 16 as well as the distance 17 can be read from the structure and/or from the design of the vehicle coupling 1.

In the FIG. 3, the distance 16 represents a distance extending between the first pin 10 and the second pin 11 in the direction of the longitudinal axis 12 of the connection flange 3.

The distance 17 represents the distance extending between the first pin 10 and the second pin 11 in a radial direction relative to the longitudinal access 12 of the connection flange 3.

Due to the angle of the slope 26 of the road, in the FIG. 3 the force 18 (F tongue) acts on the tow ball 13 of the vehicle coupling 1 in a vertical manner. This is because the force of the communicating portion of the trailer's coupling (not shown) rests vertically on the hook 4 of the towing vehicle 2.

Due to the angle of the slope 26 of the road, in the FIG. 3 the linking element 5 is arranged approximately vertically relative to the horizontal plane 30.

LIST OF REFERENCES 1. vehicle coupling
2. towing vehicle
3. connection flange
4. hook
5. linking element
6. first opening
7. second opening
8. opening
9. opening
10. first pin
11. second pin
12. longitudinal axis
13. tow ball
14. vertical
15. acute angle
16. distance
17. distance
18. force
19. torque sensor
20. torque sensor
21. (T1) force
22. (T2) force 23. signal
24. signal
25. distance
26. angle of slope of the road
27. pull force
28. distance
29. centre
30. horizontal plane
31. angle
32. gyrometer

The invention claimed is:

1. A force sensing device adapted and configured for generating an output signal representative of a magnitude and a direction of a force acting on a coupling, the force sensing device comprising:
  a hook; and
  a linking element adapted and configured for linking the hook to a connection flange;
  wherein the linking element is operatively connected to the hook by at least one first pin, and the linking element is adapted and configured to be operatively connected to the connection flange by at least one second pin, the at least one first pin comprises a first torque sensor, the at least one second pin comprises a second torque sensor, the linking element is arranged at an angle with respect to the hook such that the linking element does not reach a position in which the at least one first pin and the at least one second pin are arranged one above the other in a vertical direction relative to a longitudinal axis of the connection flange regardless of an angle of slope between an imaginary horizontal plane and the longitudinal axis of the connection flange.

2. A force sensing device according to claim 1 wherein the force sensing device generates a signal representative of a difference of individual signal values of the respective torque sensors.

3. A force sensing device according to claim 1 wherein the torque sensors are connected to each other in series.

4. A force sensing device according to claim 1 wherein the linking element is arranged at an acute angle relative to the vertical direction relative to the longitudinal axis of the connection flange.

5. A force sensing device according to claim 1 wherein the hook comprises a tow ball coupling.

6. A force sensing device according to claim 1 wherein a distance extending between a first pin and a second pin in the direction of the longitudinal axis of the connection flange is a selected value.

7. A force sensing device according to claim 4 wherein a distance extending between the first pin and the second pin in a radial direction relative to the longitudinal axis of the connection flange is a selected value.

8. A force sensing device according to claim 1 further comprising a gyrometer enabled for determining the angle of slope between the longitudinal axis of the connection flange and the imaginary horizontal plane, the gyrometer being connected to a vehicle.

* * * * *